(12) United States Patent
Zhang et al.

(10) Patent No.: US 12,510,259 B2
(45) Date of Patent: Dec. 30, 2025

(54) INDOOR ADAPTIVE VENTILATION SYSTEM AND METHOD BASED ON MULTI-VENT VENTILATION MODULES

(71) Applicant: Beijing University of Technology, Beijing (CN)

(72) Inventors: Weirong Zhang, Beijing (CN); Haotian Zhang, Beijing (CN); Weijia Zhang, Beijing (CN); Zhixi Qing, Beijing (CN)

(*) Notice: Subject to any disclaimer, the term of this patent is extended or adjusted under 35 U.S.C. 154(b) by 319 days.

(21) Appl. No.: 17/672,716

(22) Filed: Feb. 16, 2022

(65) Prior Publication Data
US 2023/0151980 A1    May 18, 2023

(30) Foreign Application Priority Data
Nov. 13, 2021    (CN) .......................... 202111343603.8

(51) Int. Cl.
| | |
|---|---|
| *F24F 7/08* | (2006.01) |
| *F24F 11/65* | (2018.01) |
| *F24F 13/02* | (2006.01) |
| *F24F 13/06* | (2006.01) |

(52) U.S. Cl.
CPC ............... *F24F 7/08* (2013.01); *F24F 11/65* (2018.01); *F24F 13/06* (2013.01)

(58) Field of Classification Search
CPC .... F24F 7/08; F24F 11/64; F24F 13/02; F24F 13/06; F24F 2221/38; F24F 2013/0616; F16K 11/052; F16K 11/0525
See application file for complete search history.

(56) References Cited

FOREIGN PATENT DOCUMENTS

| | | | | |
|---|---|---|---|---|
| CN | 101641539 A | * | 2/2010 | .......... F16K 11/0853 |
| DE | 102015201604 A1 | * | 8/2016 | ................ F24F 7/08 |
| WO | WO-2016204621 A2 | * | 12/2016 | .......... F24F 13/0236 |
| WO | WO-2018025919 A1 | * | 2/2018 | .......... F24F 13/0209 |

OTHER PUBLICATIONS

CN101641539 and translation (Year: 2010).*
DE102015201604 and translation (Year: 2016).*
WO2016204621 and translation (Year: 2016).*
WO2018025919 and translation (Year: 2018).*

* cited by examiner

*Primary Examiner* — Steven S Anderson, II

(57) ABSTRACT

The invention discloses an indoor adaptive ventilation system and method based on multi-vent ventilation modules, comprising at least one multi-vent ventilation module, the multi-vent ventilation modules comprise air reversing valves and ventilation ducts, the multi-vent ventilation ducts are connected with the air reversing valves, the air reversing valve comprises a box body, a box cover, a reversing mechanism, a supply air main duct, a return air main duct, a fixed supply air branch duct and multiple variable air direction branch ducts; a plurality of variable air direction branch ducts are evenly arranged in the circumferential direction of the box body. The invention can divide the indoor space into different sub-spaces, control pollutants in a smaller area, reduce the possibility of large-scale pollutant diffusion, and realize that the supply air outlets and the return air outlets can be switched mutually to adapt to different usage scenarios and needs.

2 Claims, 13 Drawing Sheets

INDOOR ADAPTIVE VENTILATION SYSTEM AND METHOD BASED ON MULTI-VENT VENTILATION MODULES

TECHNICAL FIELD

The invention relates to a ventilation system, in particular to an indoor adaptive ventilation system and method based on multi-vent ventilation modules, belonging to the field of indoor ventilation technology.

BACKGROUND

With the continuous improvement of people's living standards, the ventilation method that regards the entire room as a whole to regulate and control has gradually been unable to meet people's needs for indoor ventilation. These existing ventilation methods have strong versatility but poor adaptability, when using a ventilation and air-conditioning system in a room, it is not only difficult to adapt to different use functions or use requirements, but also unable to create the most suitable indoor environment, and in face of the threat of large-scale airborne diseases today, this method of mixing indoor air will increase the probability of cross-infection among people in the entire room.

Therefore, how to provide an indoor adaptive ventilation system and method based on multi-vent ventilation modules has become an urgent problem for those skilled in the art.

SUMMARY OF THE INVENTION

In view of this, the invention provides an indoor adaptive ventilation system and method based on multi-vent ventilation modules, which can divide the indoor space into different sub-spaces, control pollutants in a smaller area, reduce the possibility of large-scale pollutant diffusion, and realize that the supply air outlets and the return air outlets can be switched mutually to adapt to different usage scenarios and needs.

In order to achieve the above objects, the invention adopts the following technical scheme:

an indoor adaptive ventilation system based on multi-vent ventilation modules, comprising at least one multi-vent ventilation module, the multi-vent ventilation modules comprise air reversing valves and ventilation ducts, the multi-vent ventilation ducts are connected with the air reversing valves, the air reversing valve comprises a box body, a box cover, a reversing mechanism, a supply air main duct, a return air main duct, a fixed supply air branch duct and multiple variable air direction branch ducts, a cavity is arranged inside the box body, the box cover is buckled at the top of the box body, the reversing mechanism is installed in the cavity, the center of the top of the box cover is connected with the supply air main duct, and the center of the bottom of the box body is connected with the return air main duct; the fixed supply air branch duct is connected to one side of the supply air main duct; a plurality of variable air direction branch ducts are evenly arranged in the circumferential direction of the box body.

Further, the box body and the box cover are provided with air outlets, which are respectively connected with the supply air main duct, the return air main duct, the fixed supply air branch duct and a plurality of variable air direction branch ducts.

Further, there are three variable air direction branch ducts, the center lines of the three variable air direction branch ducts are on the same plane, and the angle between the center lines of adjacent variable air direction branch ducts is 120 degrees.

Further, the reversing mechanism comprises a center rod, a gear, a motor, longitudinal partitions, a transverse bottom plate and transverse top plates, the center rod is arranged in the cavity and is rotatably connected with the center of the bottom of the box body, the gear is connected to the top of the center rod, the motor is installed at the bottom end of the box cover, and the output end of the motor engages with the gear, there are three partitions, which are evenly distributed in the circumferential direction of the central rod; the three partitions divide the cavity into three regions, and the bottom end of one region is connected with the transverse bottom plate, and the top ends of the other two regions are both connected with the transverse top plates.

Further, there are a plurality of multi-vent ventilation modules arranged side by side in parallel; adjusting the reversing mechanism can respectively form three modes of supply air outlets and return air outlets: cross mode, parallel mode and vertical mode.

An indoor adaptive ventilation method based on multi-vent ventilation modules, wherein according to the requirements of indoor space division, multi-vent ventilation modules are installed individually or in groups at appropriate locations indoors to adapt to indoor buildings of different scales; individual arrangement realizes personalized control in a small range, and group arrangement provides an adaptive solution for environmental control in different application scenarios or different personnel gathering modes.

Further, the method for individual arrangement to realize personalized control in a small range: adjust the multi-vent ventilation modules to realize the switching between the three modes of cross mode, parallel mode and vertical mode of the supply air outlets and return air outlets.

Further, the group arrangement provides an adaptive solution for environmental control in different application scenarios or different personnel gathering modes: adjust multiple multi-vent ventilation modules respectively to realize the switch between the three modes of cross mode, parallel mode and vertical mode of the supply air outlets and return air outlets.

The advantageous effects of the invention are as follows:

The invention is a ventilation strategy that can divide the indoor space into multiple sub-spaces, control pollutants in a smaller area, reduce the possibility of large-scale pollutant diffusion, and realize that the supply air outlets and the return air outlets can be switched mutually to adapt to different usage scenarios and needs, and can prevent the mass infection caused by the large-scale spread of pollutants released by the infected person in the entire room, at the same time, it can also adapt to different indoor functional requirements and improve the thermal comfort of indoor personnel when there is no threat of disease transmission.

BRIEF DESCRIPTION OF THE DRAWINGS

In order to explain the embodiments of the invention or the technical schemes in the prior art more clearly, the following will briefly introduce the drawings that need to be used in the description of the embodiments or the prior art, obviously, the drawings in the following description are only some embodiments of the invention, for those skilled in the art, other drawings can be obtained based on the provided drawings without creative work.

As shown in the figure.

1 refers to the box body, 2 refers to the box cover, 3 refers to the longitudinal partitions, 4 refers to the supply air main duct, 5 refers to the return air main duct, 6 refers to the fixed supply air branch duct, 7 refers to the variable air direction branch ducts, 8 refers to the center rod, 9 refers to the gear, 10 refers to the motor, 11 refers to the transverse bottom plate, 12 refers to the transverse top plates, 100 refers to the air reversing valves, 200 refers to the ventilation ducts.

DESCRIPTION OF EMBODIMENTS

The technical scheme in the embodiments of the invention will be clearly and completely described below in combination with the drawings in the embodiments of the invention, obviously, the described embodiments are only part of the embodiments of the invention, not all of the embodiments of the invention. Based on the embodiments of the invention, all other embodiments obtained by those skilled in the art without creative work belong to the protection scope of the invention.

Figure 1:
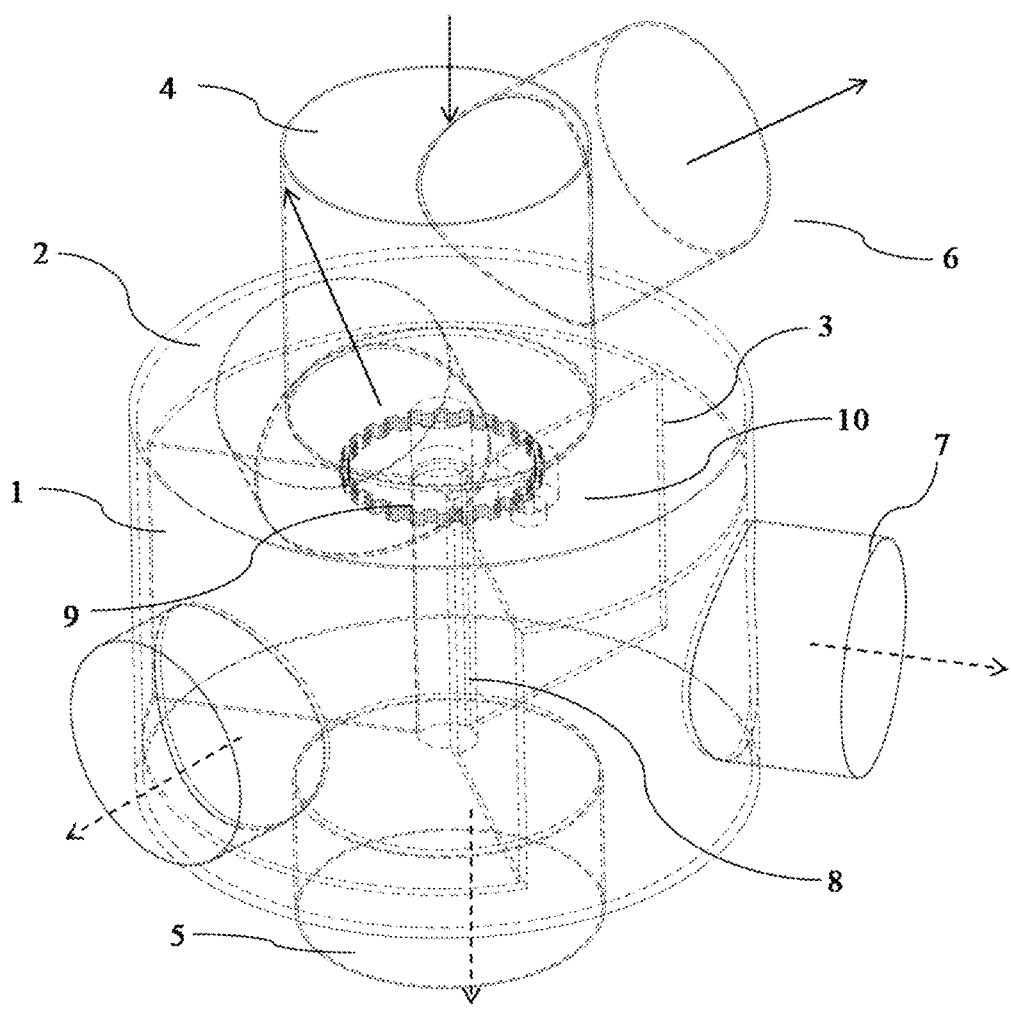
FIG. 1 is a schematic diagram of the invention.
Figure 2:
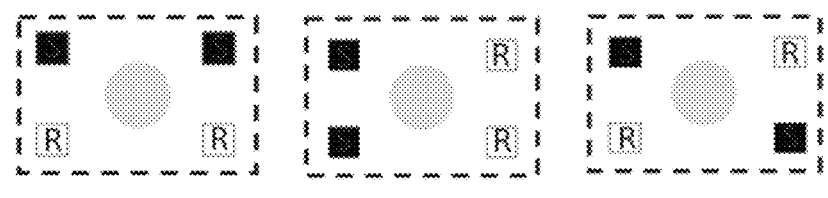
FIG. 2 is a diagram of three different modes of air outlets realized by a single multi-vent ventilation module of the invention.

Referring to FIG. 1-2, the invention provides an indoor adaptive ventilation system based on multi-vent ventilation modules, comprising at least one multi-vent ventilation module, the multi-vent ventilation modules comprise air reversing valves 100 and ventilation ducts 200, the multi-vent ventilation ducts 200 are connected with the air reversing valves 100, the air reversing valve comprises a box body 1, a box cover 2, a reversing mechanism, a supply air main duct 4, a return air main duct 5, a fixed supply air branch duct 6 and multiple variable air direction branch ducts 7, a cavity is arranged inside the box body 1, the box cover 2 is buckled at the top of the box body 1, the reversing mechanism is installed in the cavity, the center of the top of the box cover 2 is connected with the supply air main duct 4, and the center of the bottom of the box body 1 is connected with the return air main duct 5; the fixed supply air branch duct 6 is connected to one side of the supply air main duct 4; a plurality of variable air direction branch ducts 7 are evenly arranged in the circumferential direction of the box body 1.

The box body 1 and the box cover 2 are provided with air outlets, which are respectively connected with the supply air main duct 4, the return air main duct 5, the fixed supply air branch duct 6 and a plurality of variable air direction branch ducts 7 to achieve air supply and return, so as to achieve the update of the indoor air environment. In FIG. 1, the solid arrow represents the supply air and the dotted arrow represents the return air.

There are three variable air direction branch ducts 7, the center lines of the three variable air direction branch ducts 7 are on the same plane, and the angle between the center lines of adjacent variable air direction branch ducts 7 is 120 degrees.

Figure 3:
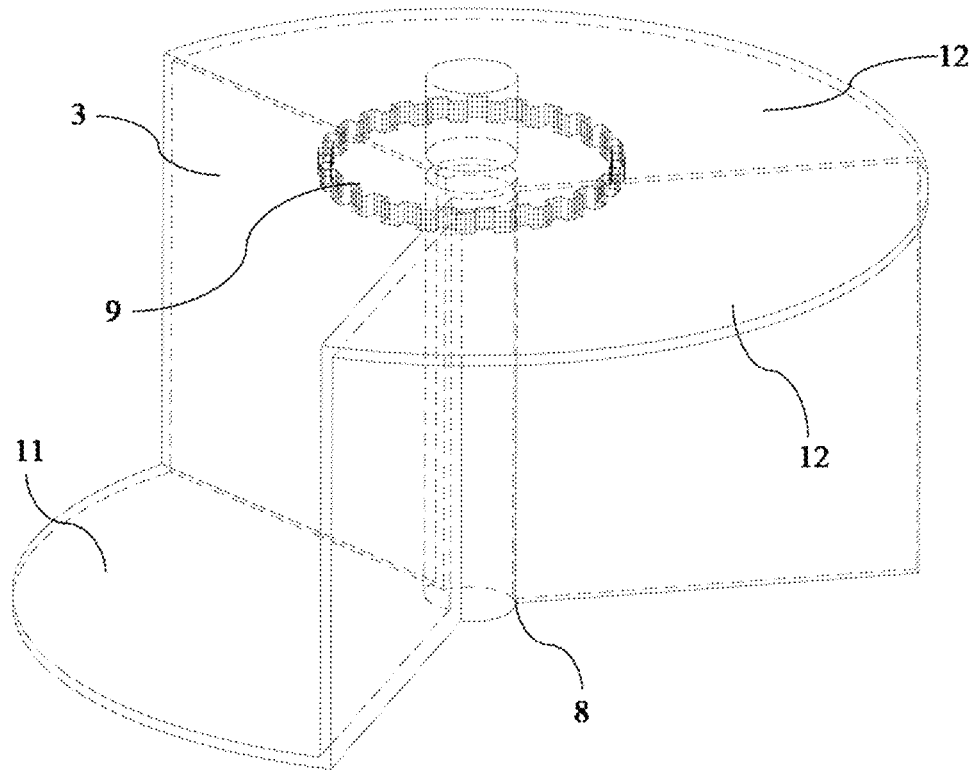
FIG. 3 is a schematic diagram of the connection structure between the longitudinal partitions, a transverse bottom plate and transverse top plates.

Referring to FIG. 3, the reversing mechanism comprises a center rod 8, a gear 9, a motor 10, longitudinal partitions 3, a transverse bottom plate 11 and transverse top plates 12, the center rod 8 is arranged in the cavity and is rotatably connected with the center of the bottom of the box body 1, the gear 9 is connected to the top of the center rod 8, the motor 10 is installed at the bottom end of the box cover 2, and the output end of the motor 10 engages with the gear 9, there are three partitions 3, which are evenly distributed in the circumferential direction of the central rod 8; the three partitions 3 divide the cavity into three regions, and the bottom end of one region is connected with the transverse bottom plate 11, and the top ends of the other two regions are both connected with the transverse top plates 12. The motor rotates to drive the gear to rotate, so as to drive the center rod connected with three partitions to rotate, the positions of the fixed supply air branch duct and the three variable air direction branch ducts remain unchanged, the change of the position of longitudinal partitions 3, a transverse bottom plate 11 and transverse top plates 12 can realize the switching between the three modes of the supply air outlets and return air outlets. Three partitions divide the cavity into three regions, and the region directly above the transverse bottom plate 11 is the supply air cavity, the variable air direction branch duct connected with the supply air cavity is the supply air branch duct, the regions directly below the transverse top plates 12 are the return air cavities, the variable air direction branch ducts respectively connected with the two return air cavities are the return air branch ducts. In addition, under the action of the motor, the supply air branch duct and the return air branch ducts can be switched.

Further, there are a plurality of multi-vent ventilation modules arranged side by side in parallel, comprising n rows and m columns; adjusting the reversing mechanism can respectively form three modes of supply air outlets and return air outlets: cross mode, parallel mode and vertical mode.

Figure 4:
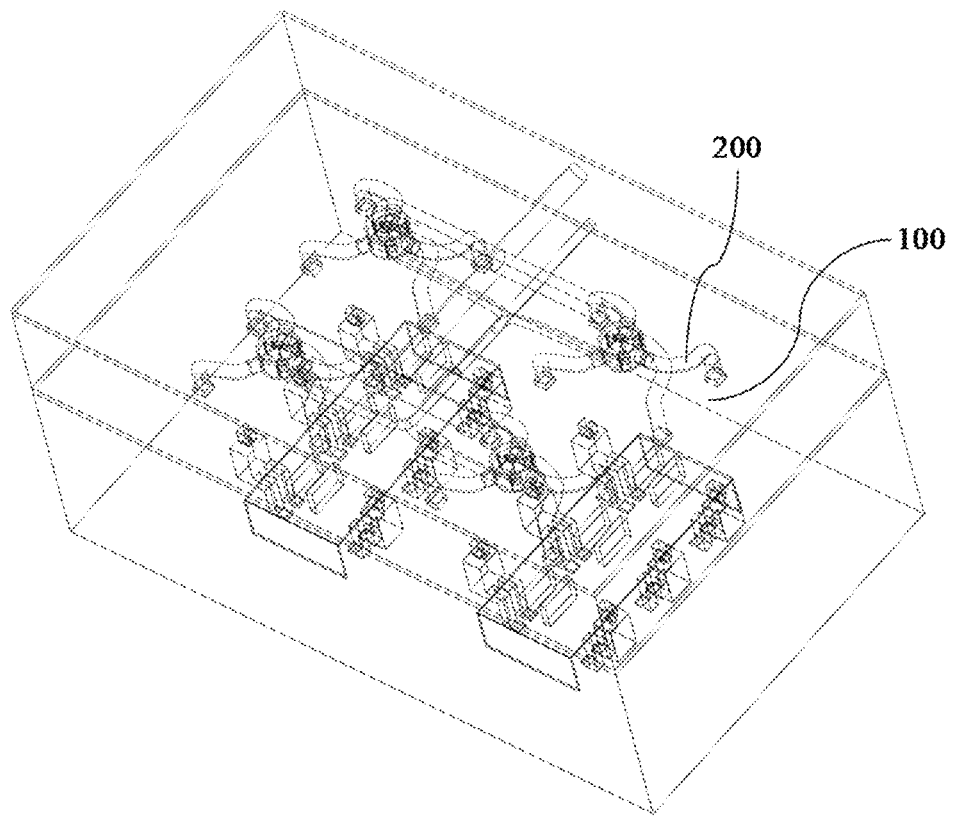
FIG. 4 is application diagram 2 of the adaptive ventilation system.

FIG. 4 shows the application of adaptive ventilation in an office, the office uses a combination of four groups of ventilation modules, arranged in 2*2, that is, there are a total of 16 air outlets on the top. The scheme can divide the indoor space into several sub-spaces for control, avoiding the spread of pollutants in a large area in the room, and reducing the situation of group infection. At the same time, the switchable supply air outlets and return air outlets can reduce the situation that indoor personnel are always located under the supply air outlets or return air outlets, reduce the uncomfortable feeling caused by the direct blowing of the air outlets, and reduce the discomfort caused by being in the return air zone with poor air quality for a long time.

The invention also provides an indoor adaptive ventilation method based on multi-vent ventilation modules, wherein according to the requirements of indoor space division, multi-vent ventilation modules are installed individually or in groups at appropriate locations indoors to adapt to indoor buildings of different scales; individual arrangement realizes personalized control in a small range, and group arrangement provides an adaptive solution for environmental control in different application scenarios or different personnel gathering modes.

The method for individual arrangement to realize personalized control in a small range: adjust the multi-vent ventilation modules to realize the switching between the three modes of cross mode, parallel mode and vertical mode of the supply air outlets and return air outlets.

The group arrangement provides an adaptive solution for environmental control in different application scenarios or different personnel gathering modes: adjust multiple multi-vent ventilation modules respectively to realize the switch between the three modes of cross mode, parallel mode and vertical mode of the supply air outlets and return air outlets.

The invention is a ventilation strategy that can divide the indoor space into multiple sub-spaces, control pollutants in a smaller area, reduce the possibility of large-scale pollutant diffusion, and realize that the supply air outlets and the return air outlets can be switched mutually to adapt to different usage scenarios and needs, and can prevent the mass infection caused by the large-scale spread of pollutants released by the infected person in the entire room, at the same time, it can also adapt to different indoor functional requirements and improve the thermal comfort of indoor personnel when there is no threat of disease transmission.

The invention provides an indoor adaptive ventilation system and method based on multi-vent ventilation modules, multi-vent ventilation modules are installed individually or in groups to achieve the division of indoor space, which can adapt to indoor buildings of different scales. Individual arrangement can realize personalized control in a small range, and group arrangement can provide an adaptive solution for environmental control in different application scenarios or different personnel gathering modes; adaptive ventilation can switch to the most suitable mode of air outlets for different locations of infected persons to reduce the spread of indoor pollutants, and protect indoor personnel.

The invention can solve the following problems existing in the prior art:

Most of the existing ventilation methods cannot achieve partitioning and independent control of the indoor space, and it is difficult to meet the environmental needs of individualized ventilation in a small area; the position of the supply air outlets and return air outlets of existing top supply air is mostly fixed, if the indoor function or the gathering situation of people changes, the system of fixed supply air outlets and return air outlets cannot realize the change of the positions of the supply air outlets and return air outlets and cannot adapt to the new demands; the existing mixing ventilation mode is likely to cause pollutants to spread in a large area in the room and easily cause group infection.

Embodiment 1

Figure 5:
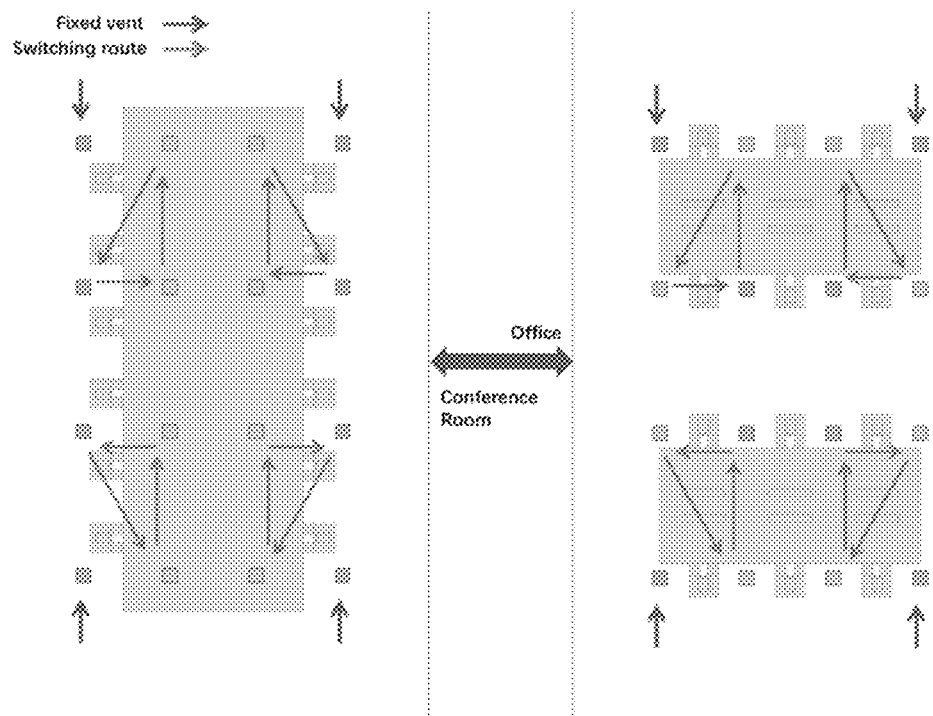
FIG. 5 is a schematic diagram of switching of adaptive ventilation system.

In real life, the use function of the room is often not fixed, and the gathering mode of personnel is not always consistent. Therefore, using the same mode of air outlets can not meet all requirements. FIG. 5 shows the scheme of the change of the air outlets when the function of the same room is switched between the conference room and the office. In the conference mode, there are supply air outlets above the two rows of people, through which fresh air is sent into the room, and the return air outlets are located above the table. This scheme can ensure that each participant can get enough fresh air in the case of a long meeting. When the office mode is restored, the mode of the air outlets can be changed according to requirements. Adaptive ventilation can also be applied in the classroom, nowadays, students often experience various links such as teaching, discussion, and reporting during class, each link has a different distribution of indoor personnel, and the use of adaptive ventilation can achieve different modes of supply air outlets and return air outlets for different distributions of indoor personnel to ensure the best ventilation effect at all times. Each group of ventilation modules can be switched individually or collectively, everything is based on demands.

Figure 6A:
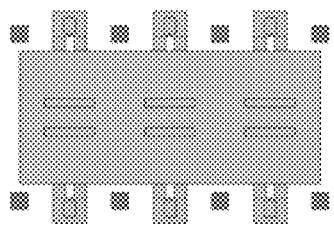
FIG. 6A is a diagram of air outlets realized by multiple multi-vent ventilation modules in a cross mode.
Figure 6A:
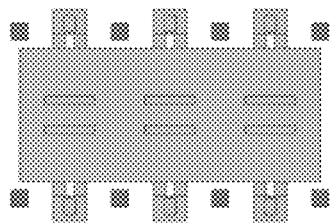
Figure 6A:
Figure 6B:
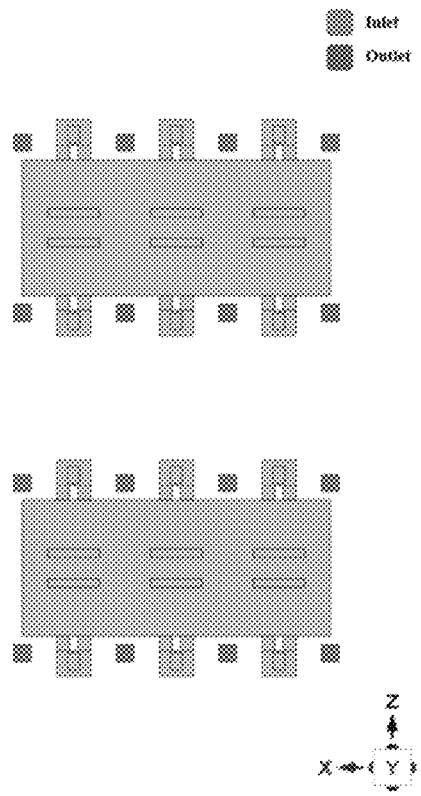
FIG. 6B is a diagram of air outlets realized by multiple multi-vent ventilation modules in a parallel mode.
Figure 6C:
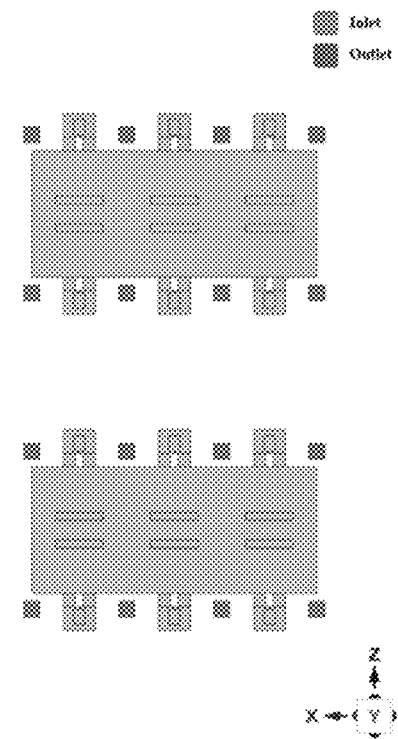
FIG. 6C is a diagram of air outlets realized by multiple multi-vent ventilation modules in a vertical mode.

As shown in FIG. 6A-6C, FIG. 6A is a cross mode, FIG. 6B is a parallel mode, and FIG. 6C is a vertical mode. When the indoor use is fixed, adaptive ventilation can also reduce the diffusion of pollutants in the room through the switching of the mode of air outlets. Different modes of air outlets will form different airflow organization patterns, and their performances in the face of different locations of infection source are also different. By choosing the most suitable mode of air outlets at this location, the infection risk of other people in the room can be further reduced.

Embodiment 2

1. Model Overview

Selecting a typical office with a size of 10 m*6 m*3 m, there are two desks in the room, and the heights of desks are 0.7 m, and the sizes of desktops are 3.6 m*1.6 m. Six monitors with the sizes of 0.6 m*0.4 m are placed on each desk. At the same time, there are 6 mannequins with a height of 1.35 m facing each other on both sides of the desks, in order to speed up the calculation, the mannequin is simplified to a head, torso and legs, the size of the mouth of the mannequin is 4.3 cm$^2$, and the airflow direction of the mouth is 30 degrees downward from the horizontal. There are 16 air outlets on the top of the office, and the size of a single air outlet is 0.2 m*0.2 m.

2. Simulation Calculation

Figure 7:
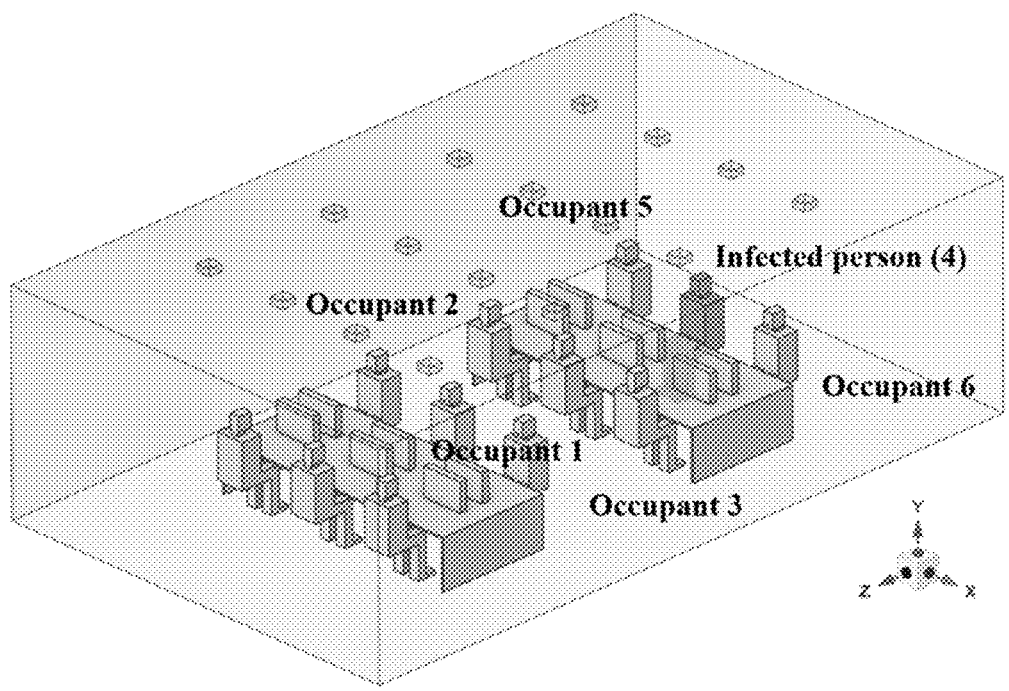
FIG. 7 is a schematic diagram of a typical office and the location of the infected person.
Figure 8A:
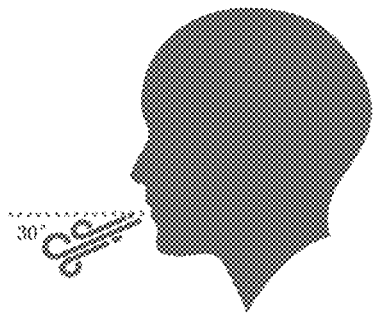
FIG. 8A is a schematic diagram of the direction of coughing.
Figure 8B:
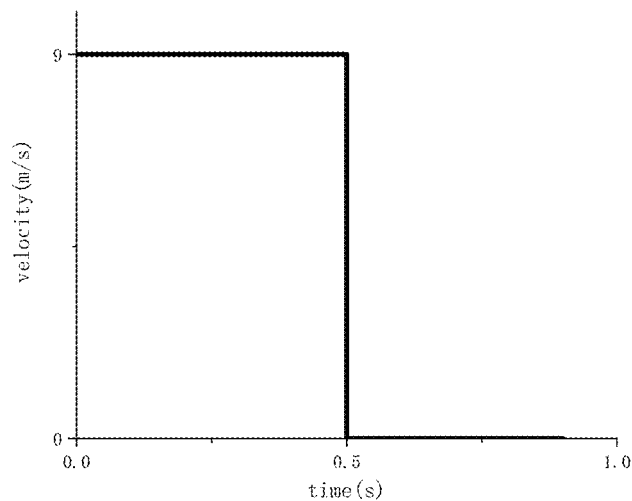
FIG. 8B is a schematic diagram of the velocity of coughing.

The indoor pollution source is assumed to be a single cough of an infected person, lasting 0.5 seconds. The infected person is in the middle of a row on the far right of the room. Occupants are numbered in FIG. 7. The boundary conditions calculated by CFD simulation are shown in Table 1. The velocity and angle of coughing are shown in FIG. 8A and FIG. 8B. FIG. 8A shows the direction of coughing, and FIG. 8B shows the velocity of coughing. The invention selects the achievable k-ε model for simulation. Solid wall surfaces such as walls and desktops use standard wall functions. The velocity of indoor air is low, the Boussinesq model is used to consider the buoyancy effect. Species transport models are used to calculate tracer gas $CO_2$ of the pollutant, the initial $CO_2$ mole fraction of the airflow ejected from the mouth is 4%, which is close to the $CO_2$ concentration of normal human exhalation, and the $CO_2$ concentration of the background is 0. Combined with the size of mouth and common cough flow in this embodiment, the velocity of cough is set as 9 m/s, the duration of cough is 0.5 s, which is the duration of a common single cough, and the temperature of cough airflow is 34° C. After testing the independence of meshes, the invention finally adopts a mesh generation scheme with 2.7 million meshes.

TABLE 1

Table 1 Setting of boundary conditions

| surface | boundary conditions |
| --- | --- |
| wall/ceiling/floor | wall; adiabatic |
| occupants | wall; heat flow 40 W/m² |
| mouth | velocity inlet; cough jet velocity 9 m/s; temperature 34° C.; $CO_2$ mole fraction 0.04 |
| supply air | velocity inlet; velocity 1.5 m/s; temperature 20° C. |
| exhaust air | pressure outlet; 0 Pa |

The process of the whole simulation is divided into two parts, firstly, the indoor flow field in the conventional state is obtained through steady-state calculation, and then the pollutant diffusion after the infected person coughs is calculated in the transient state. In the first 0.5 s of the transient calculation, due to the high jet velocity, in order to better restore the process of coughing, the time step is selected to be 0.01 s, and the subsequent time step is set to 0.05 s, a total of 35 s is calculated.

Figure 9A:
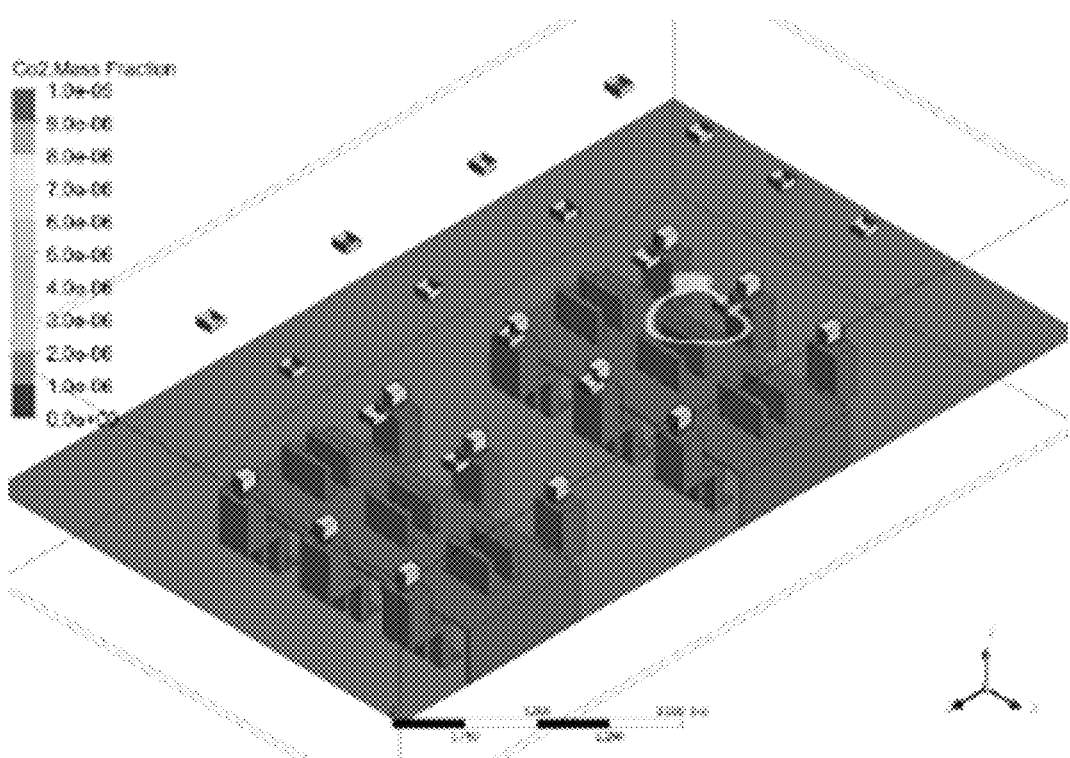
FIG. 9A is a diagram of pollutant distribution in cross mode for 5 s.
Figure 9B:
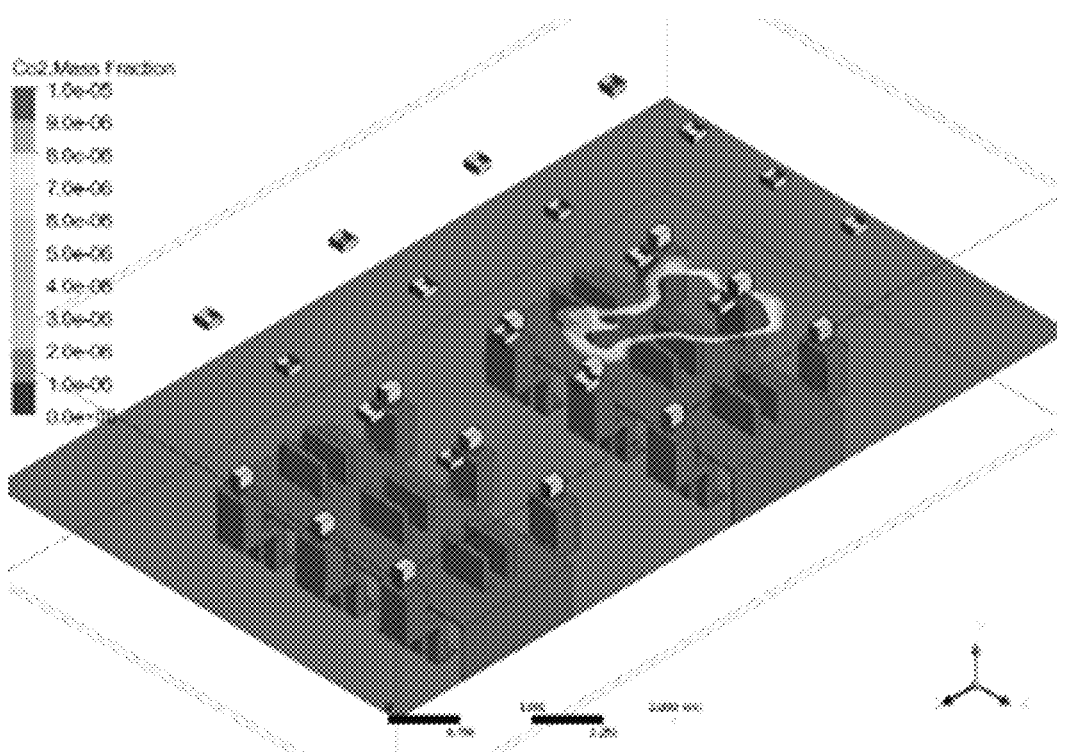
FIG. 9B is a diagram of pollutant distribution in cross mode for 15 s.
Figure 9C:
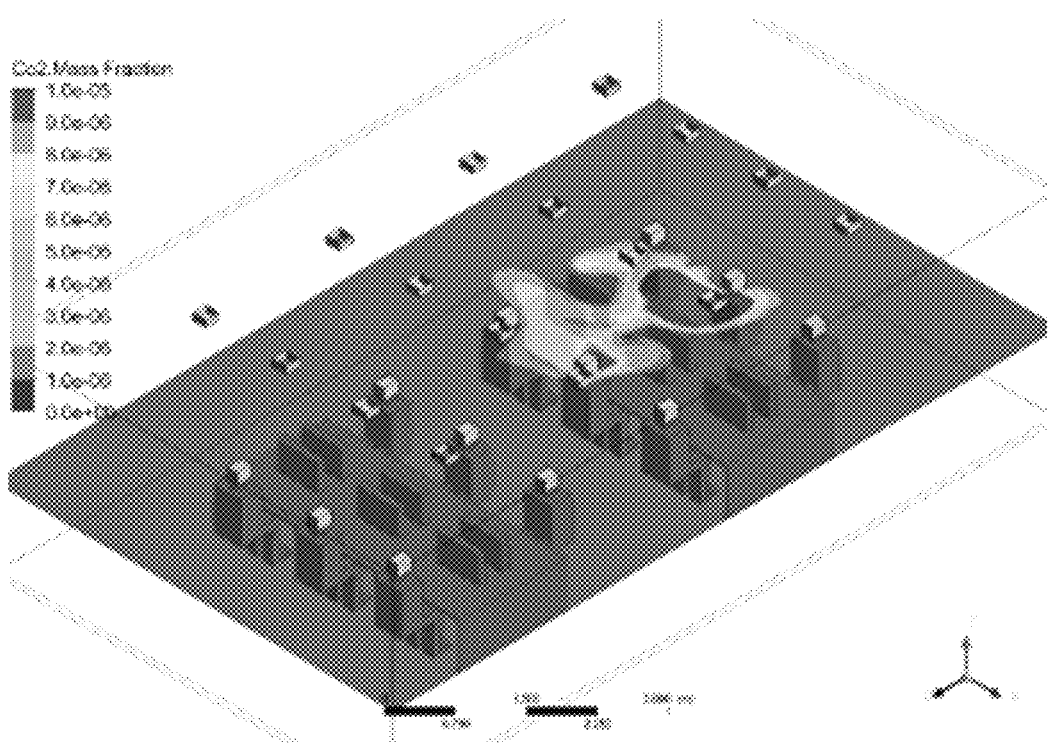
FIG. 9C is a diagram of pollutant distribution in cross mode for 30 s.
Figure 9D:
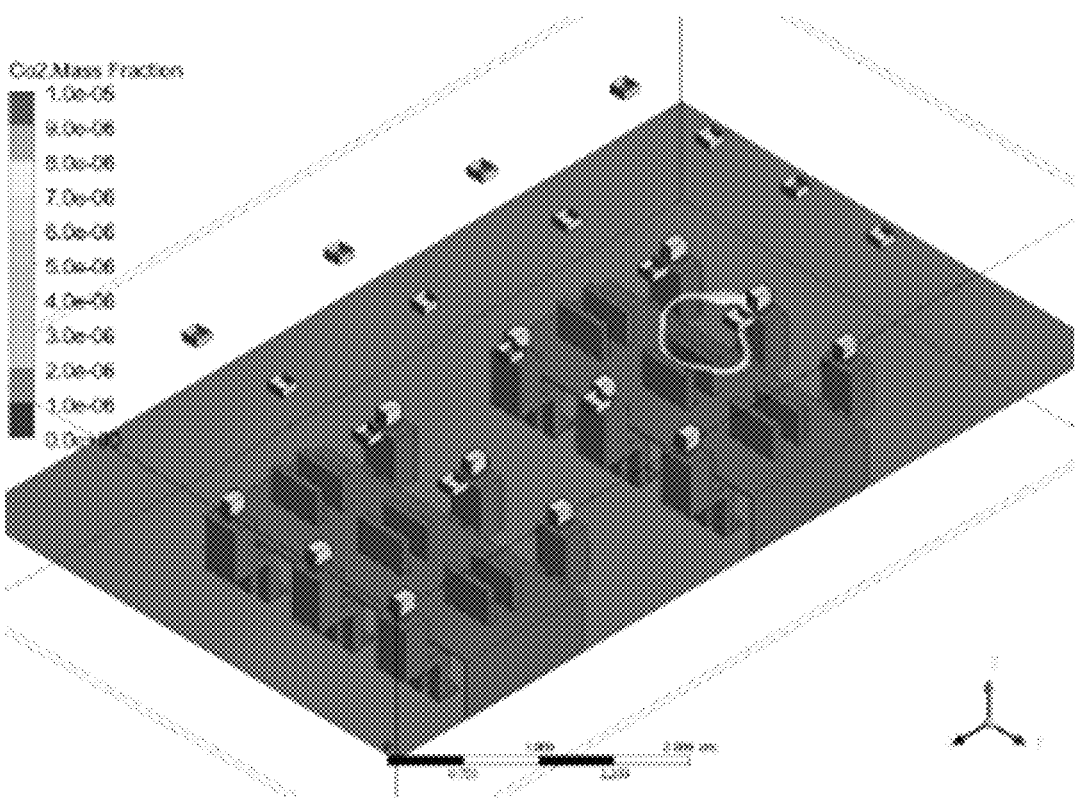
FIG. 9D is a diagram of pollutant distribution in parallel mode for 5 s.
Figure 9E:
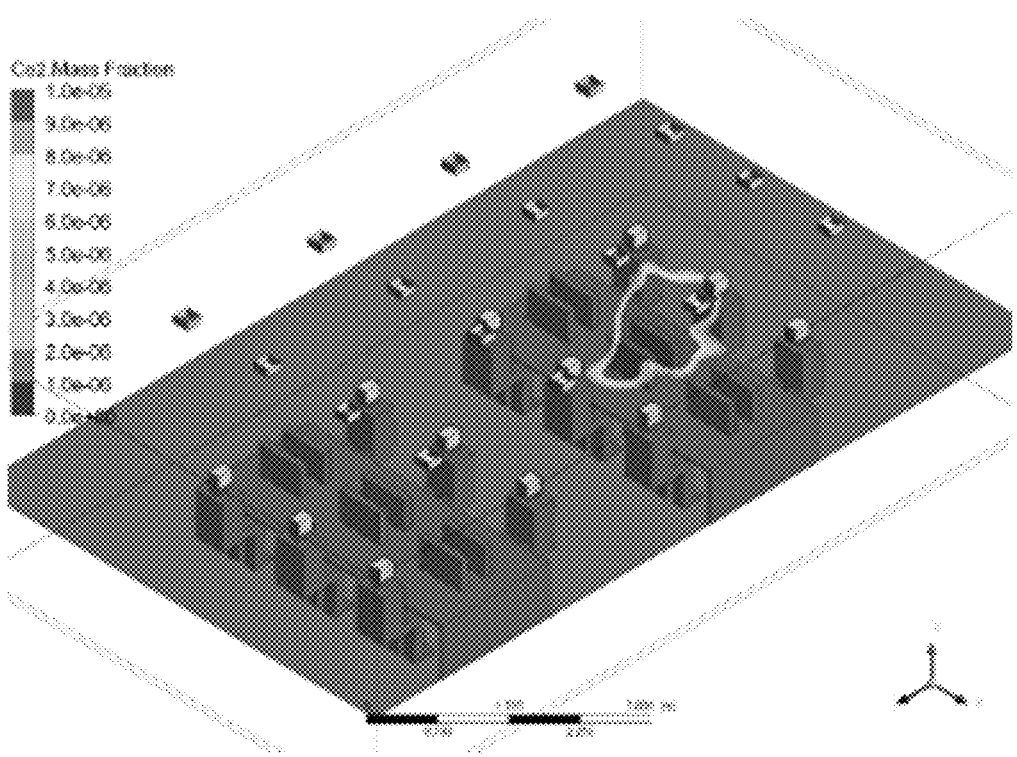
FIG. 9E is a diagram of pollutant distribution in parallel mode for 15 s.
Figure 9F:
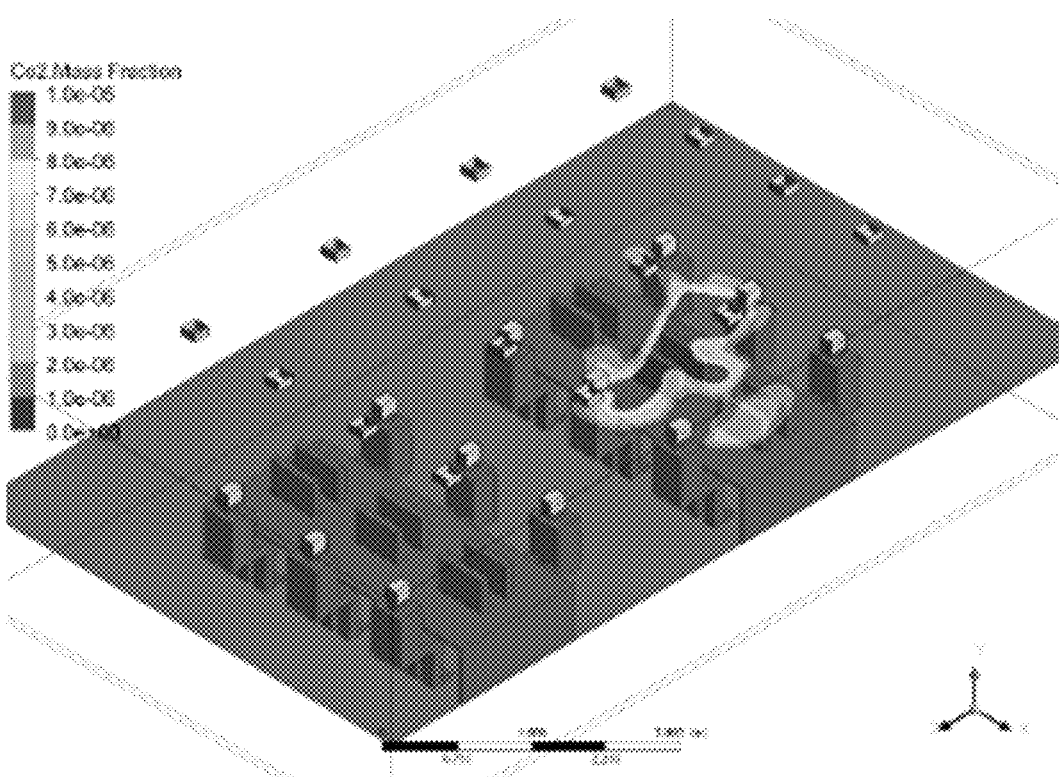
FIG. 9F is a diagram of pollutant distribution in parallel mode for 30 s.
Figure 9G:
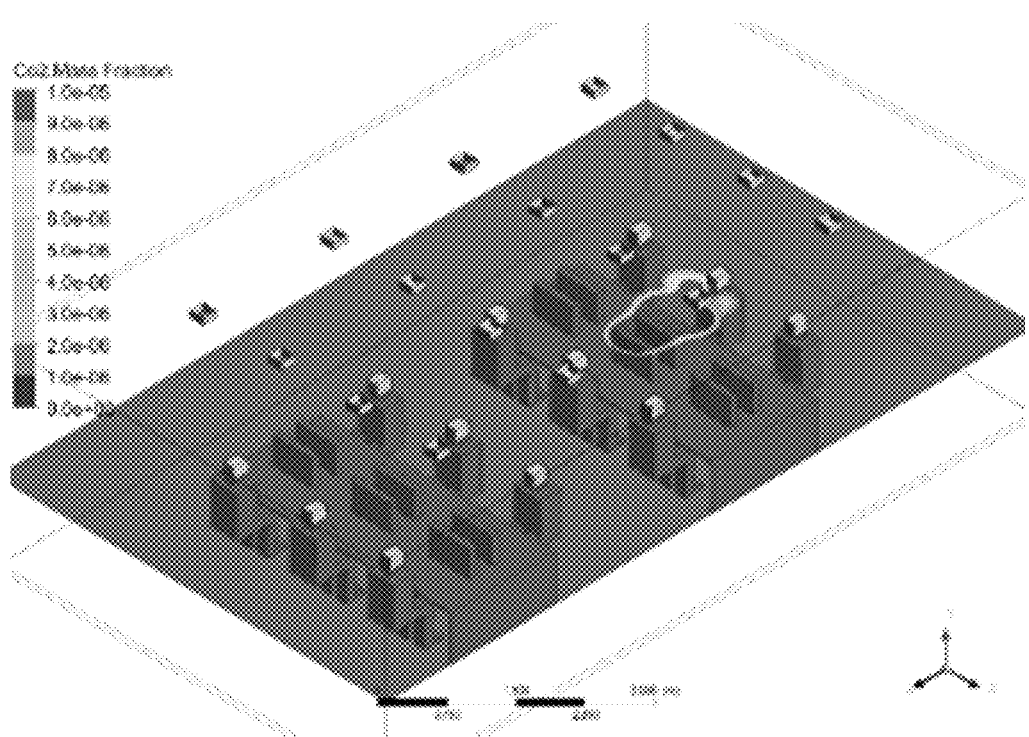
FIG. 9G is a diagram of pollutant distribution in vertical mode for 5 s.
Figure 9H:
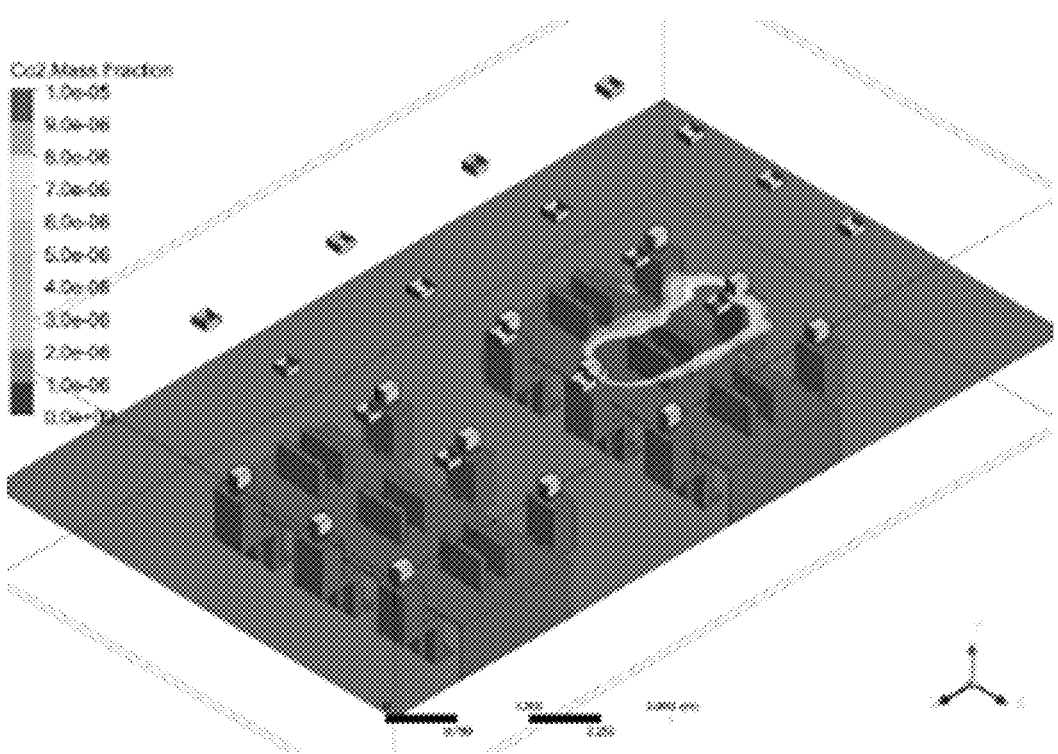
FIG. 9H is a diagram of pollutant distribution in vertical mode for 15 s.
Figure 9I:
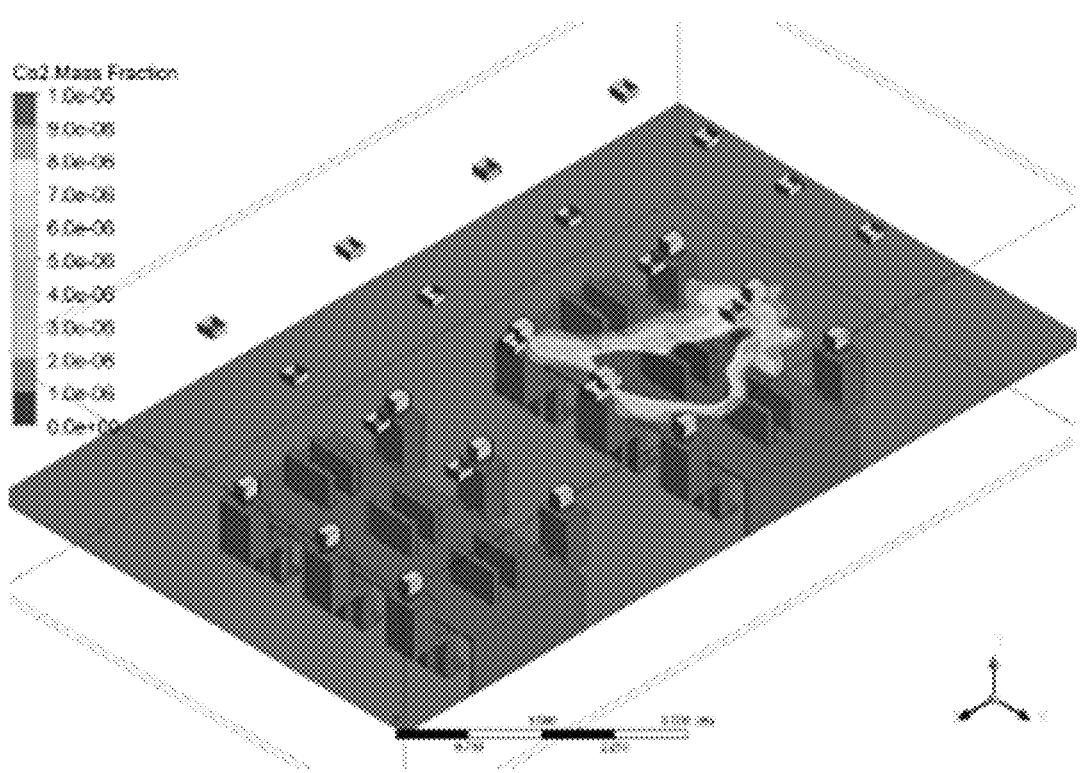
FIG. 9I is a diagram of pollutant distribution in vertical mode for 30 s.
Figure 9J:
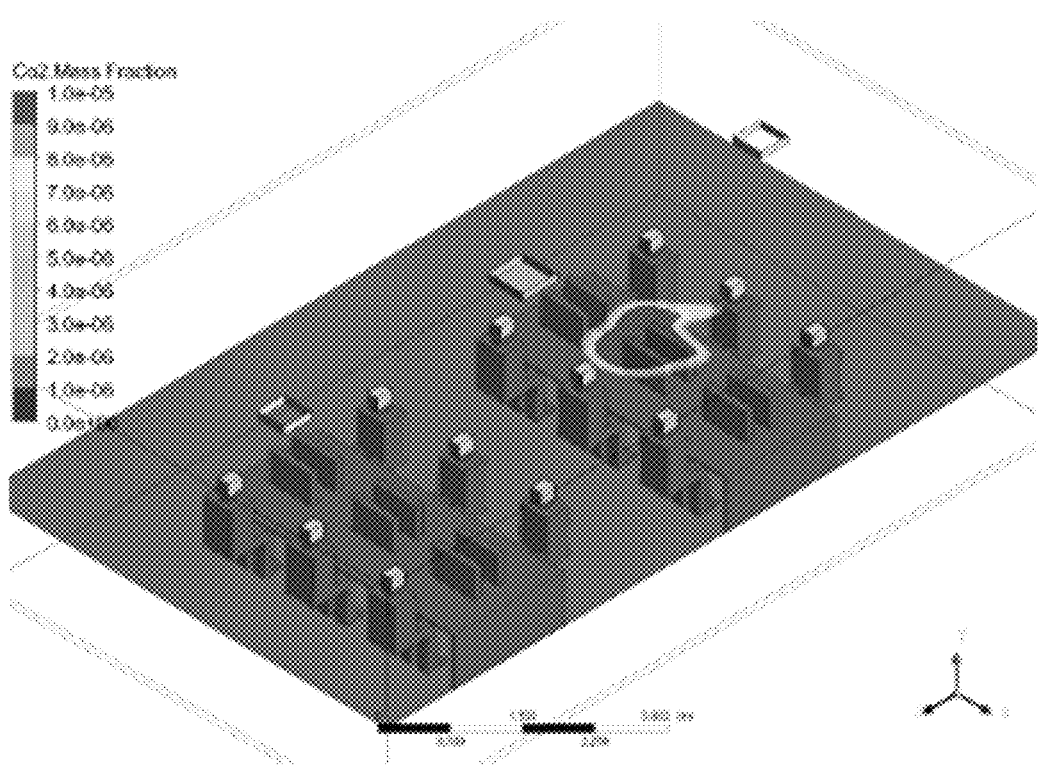
FIG. 9J is a diagram of pollutant distribution in mixing mode for 5 s.
Figure 9K:
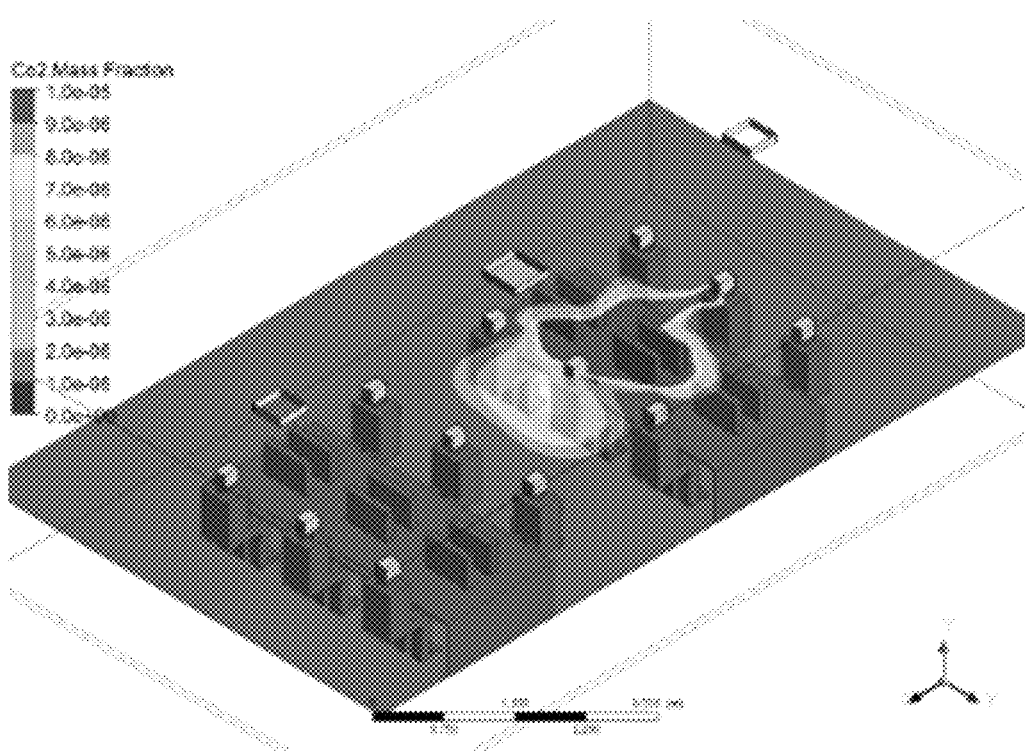
FIG. 9K is a diagram of pollutant distribution in mixing mode for 15 s.
Figure 9L:
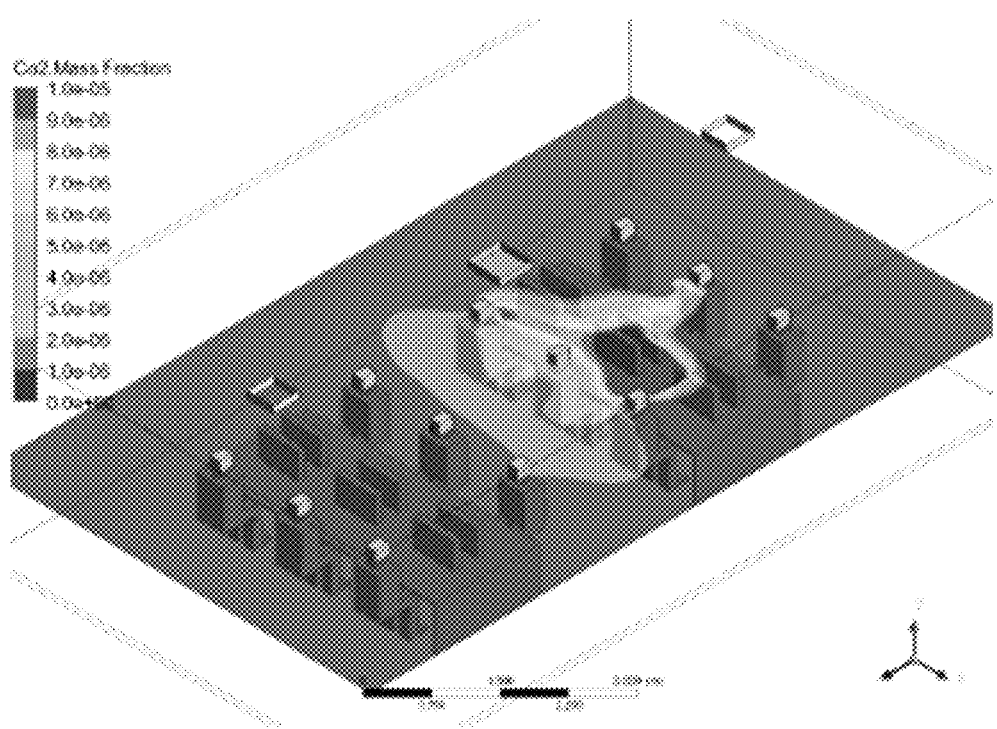
FIG. 9L is a diagram of pollutant distribution in mixing mode for 30 s.

FIG. 9A is a cross mode: 5 s, FIG. 9B is a cross mode: 15 s, FIG. 9C is a cross mode: 30 s; FIG. 9D is a parallel mode: 5 s, FIG. 9E is a parallel mode: 15 s, FIG. 9F is a parallel mode: 30 s; FIG. 9G is a vertical mode: 5 s, FIG. 9H is a vertical mode: 15 s, FIG. 9I is vertical mode: 30 s; FIG. 9J is mixing ventilation: 5 s, FIG. 9K is mixing ventilation: 15 s, and FIG. 9L is mixing ventilation: 30 s. In this embodiment, there are three achievable modes of air outlets for adaptive ventilation, namely cross mode, parallel mode and vertical mode. They are named after the position relative to the cough airflow. FIG. 9A-FIG. 9L compares the cloud maps of pollutant diffusion between adaptive ventilation and traditional mixing ventilation, the range of pollutant diffusion of mixing ventilation is significantly higher than that of adaptive ventilation. Comparing the interior of the three modes of adaptive ventilation, the area of pollutants in cross mode is larger, the range of pollutants in parallel mode presents a long and narrow strip, and the range of pollutants in vertical mode is wider, but the diffusion distance is slightly closer. This is because different modes divide the indoor space into different shapes and create different airflow organization patterns in the room, the corresponding diffusion shapes of the pollutants are different.

Figure 10A:
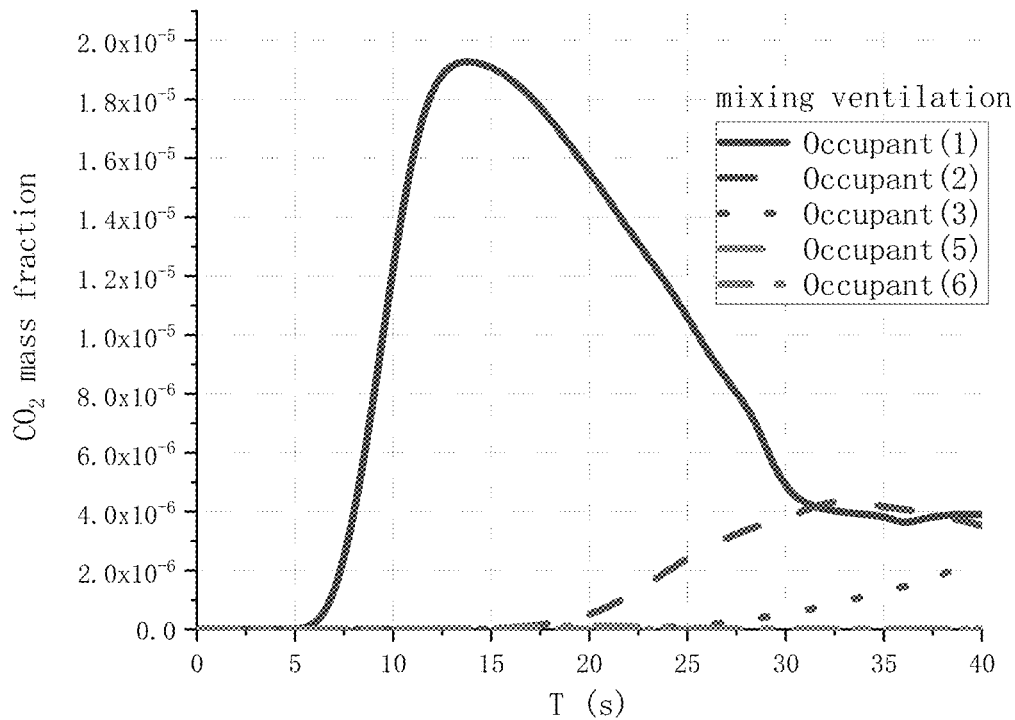
FIG. 10A is a diagram showing the changes in the concentration of pollutants in the mouth and nose of indoor personnel in mixing ventilation.
Figure 10B:
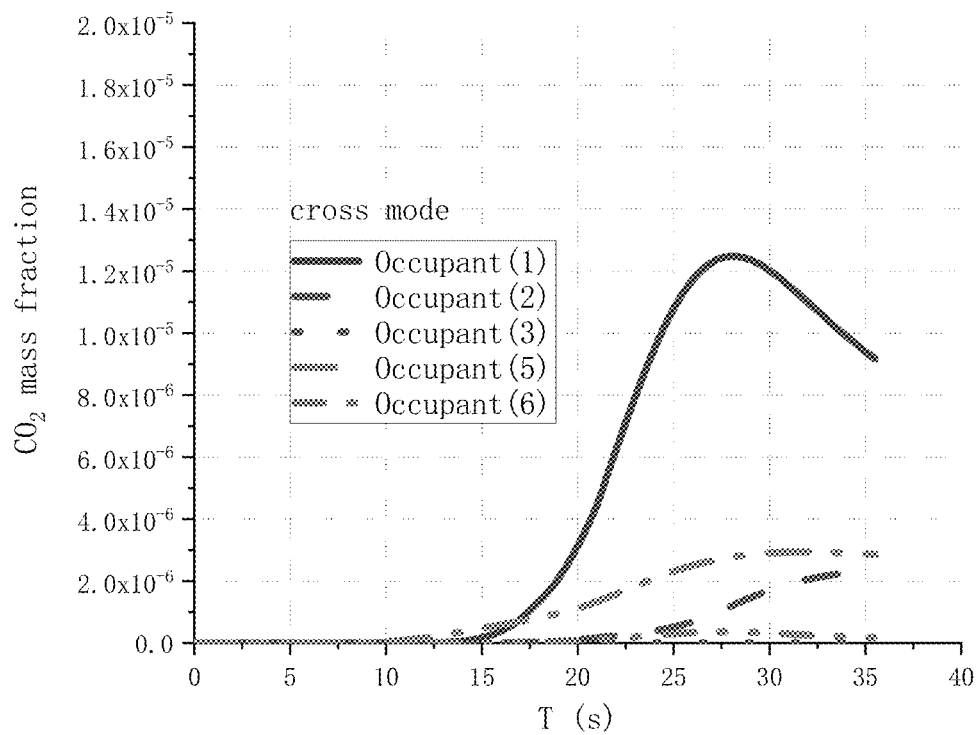
FIG. 10B is a diagram showing the changes in the concentration of pollutants in the mouth and nose of indoor personnel in cross mode.
Figure 10C:
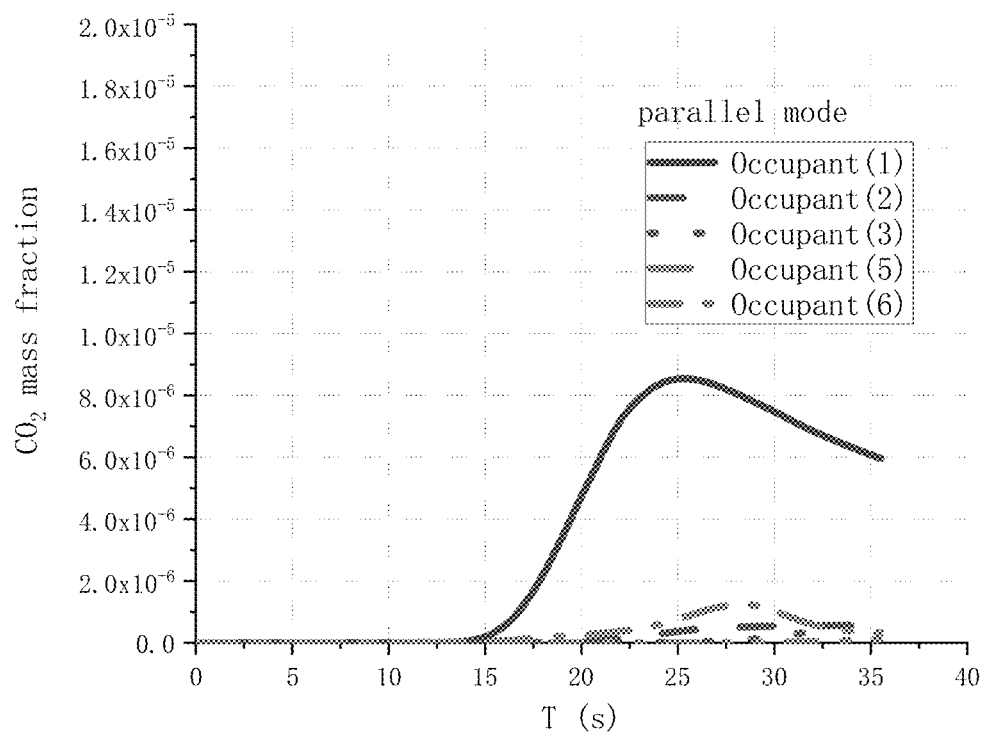
FIG. 10C is a diagram showing the changes in the concentration of pollutants in the mouth and nose of indoor personnel in parallel mode.
Figure 10D:
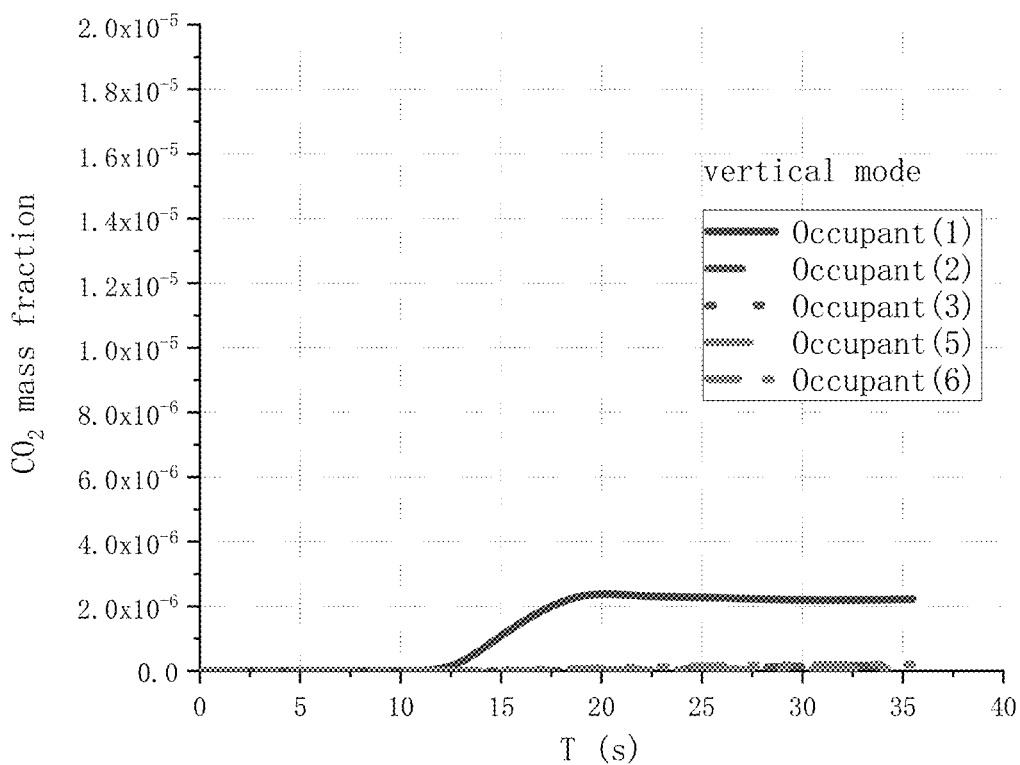
FIG. 10D is a diagram showing the changes in the concentration of pollutants in the mouth and nose of indoor personnel in vertical mode.

FIG. 10A-FIG. 10D are time-varying curves of pollutant concentrations in the mouth and nose of five occupants sitting at the same table with an infected person, FIG. 10A shows the variation of pollutant concentrations at the mouth and nose of indoor personnel in mixing ventilation, FIG. 10B shows the variation of pollutant concentrations at the mouth and nose of indoor personnel in cross mode, FIG. 10C shows the variation of pollutant concentrations at the mouth and nose of indoor personnel in parallel mode, FIG. 10D shows the variation of pollutant concentrations at the mouth and nose of indoor personnel in vertical mode, it can be seen that the mixing ventilation has the worst effect on preventing the diffusion of pollutants, Under the three adaptive ventilation modes, the concentrations of pollutants at the mouth and nose of indoor occupants are all lower than that of mixing ventilation. Among the three adaptive ventilation modes, the effect of the vertical mode is best, and the concentrations of pollutants at the mouth and nose of other occupants except the infected person are at a low level, and there is no moment of obvious high concentration.

According to the above calculation results, it can be seen that the ventilation method newly provided by the invention: an indoor adaptive ventilation method based on multi-vent ventilation modules, which is much better than traditional mixing ventilation in terms of the effect of removing pollutants. And among the three modes of air outlets for adaptive ventilation, the vertical mode is the best, which can realize the original object of the design and reduce the infection risk of indoor personnel. At the same time, adaptive ventilation can also be switched according to different indoor scenes to meet the different ventilation needs of various indoor scenes.

The invention has many advantageous effects in controlling the diffusion of pollutants, creating a healthy indoor environment, and improving the adaptability of the indoor air-conditioning system. First, the system can divide the indoor space into several sub-spaces, and control the sub-spaces individually, in terms of controlling pollutants, it can reduce the spread of pollutants in the sub-spaces and reduce the risk of respiratory disease infection of indoor personnel, in terms of creating the thermal environment, sub-spaces can be partitioned to supply, so as to avoid cold and hot mixing, and achieve an effect of saving energy and reducing consumption. At the same time, the ventilation method can adapt to different indoor functions and needs, switch the mode of air outlets at any time, improve the adaptability of the ventilation system in the room, and accurately respond to the needs.

The above description of the disclosed embodiments enables those skilled in the art to make or use the invention. Various modifications to these embodiments will be readily apparent to those skilled in the art, and the generic principles defined herein may be implemented in other embodiments without departing from the spirit or scope of the invention. Thus, the invention will not be limited to the embodiments shown herein, but will conform to the widest range consistent with the principles and novel features disclosed herein.

The invention claimed is:

1. An indoor adaptive ventilation system based on multi-vent ventilation modules, comprising at least one multi-vent ventilation module, multi-vent ventilation modules comprise air reversing valves and ventilation ducts, the multi-vent ventilation ducts are connected with the air reversing valves, the air reversing valve comprises a box body, a box cover, a reversing mechanism, a supply air main duct, a return air main duct, a fixed supply air branch duct and multiple variable air direction branch ducts, a cavity is arranged inside the box body, the box cover is buckled at the top of the box body, the reversing mechanism is installed in the cavity, the center of the top of the box cover is connected with the supply air main duct, and the center of the bottom of the box body is connected with the return air main duct; the fixed supply air branch duct is connected to one side of the supply air main duct; a plurality of variable air direction branch ducts are evenly arranged in circumferential direction of the box body;

wherein the box body and the box cover are both provided with air outlets, which are respectively connected with the supply air main duct, the return air main duct, the fixed supply air branch duct and a plurality of variable air direction branch ducts;

wherein there are three variable air direction branch ducts, the center lines of the three variable air direction branch ducts are on the same plane, and the angle between the center lines of adjacent variable air direction branch ducts is 120 degrees;

wherein the reversing mechanism comprises a center rod, a gear, a motor, longitudinal partitions, a transverse bottom plate and transverse top plates, the center rod is arranged in the cavity and is rotatably connected with the center of the bottom of the box body, the gear is connected to the top of the center rod, the motor is installed at the bottom end of the box cover, and the output end of the motor engages with the gear, there are three partitions, which are evenly distributed in the circumferential direction of the central rod; the three partitions divide the cavity into three regions, and the bottom end of one region is connected with the transverse bottom plate, and the top ends of the other two regions are both connected with the transverse top plates.

2. The indoor adaptive ventilation system based on multi-vent ventilation modules according to claim 1, wherein there are a plurality of multi-vent ventilation modules arranged side by side in parallel; adjusting the reversing mechanism can respectively form three modes of supply air outlets and return air outlets: cross mode, parallel mode and vertical mode.

* * * * *